United States Patent
Leung et al.

(10) Patent No.: US 6,817,279 B2
(45) Date of Patent: Nov. 16, 2004

(54) METHOD OF MAKING COFFEE AND COFFEE MAKER

(75) Inventors: Chi Wah Leung, Hong Kong (HK); Chi Chung Fung, Hong Kong (HK); Shek Chuen Luk, Hong Kong (HK)

(73) Assignee: Simatelex Manufactory Co., Ltd., Chaiwan (HK)

( * ) Notice: Subject to any disclaimer, the term of this patent is extended or adjusted under 35 U.S.C. 154(b) by 0 days.

(21) Appl. No.: 10/256,732

(22) Filed: Sep. 27, 2002

(65) Prior Publication Data

US 2004/0060451 A1 Apr. 1, 2004

(51) Int. Cl.⁷ ................................................ A47J 31/00
(52) U.S. Cl. .......................................... 99/287; 99/306
(58) Field of Search ...................... 99/287, 279, 304, 99/305, 306, 307, 323; 366/331, 222, 223

(56) References Cited

U.S. PATENT DOCUMENTS

| | | | | |
|---|---|---|---|---|
| 4,779,520 A | * | 10/1988 | Hauslein | 99/287 |
| 4,983,412 A | * | 1/1991 | Hauslein | 426/238 |
| 6,324,964 B1 | * | 12/2001 | Niederberger et al. | 99/287 |
| 6,564,697 B2 | * | 5/2003 | Maxwell et al. | 99/287 |

* cited by examiner

*Primary Examiner*—Reginald L. Alexander
(74) *Attorney, Agent, or Firm*—Jackson Walker LLP

(57) ABSTRACT

A coffee maker includes a water reservoir, an in-line water heater, a brew basket for receiving coffee grinds, and a water passage between the reservoir and the brew basket. The water passage passes through the in-line water heater for delivering heated water to the brew basket. A rotating paddle is removably disposed in the brew basket to stir coffee grinds in the basket while heater water is supplied to the brew basket.

6 Claims, 6 Drawing Sheets

METHOD OF MAKING COFFEE AND COFFEE MAKER

FIELD OF THE INVENTION

The invention relates to methods of making coffee and to coffee makers, and in particular to drip-type coffee makers.

BACKGROUND TO THE INVENTION

One method of making coffee includes passing heated water through coffee grinds in order to infuse the water with coffee flavour and aroma. A common type of coffee maker that employs this method is the so-called "drip-type" coffee maker.

In order to make a good cup of coffee, the water temperature should be substantially high enough throughout the whole brewing cycle, and the heated water should also evenly wet the grinds so that no over-extraction or under-extraction occurs which effects the quality of the brewed coffee.

Known Drip-type coffee makers comprise a water reservoir and a brew basket for receiving coffee grinds. A delivery tube or other water passage takes water from the water reservoir, through an in-line water heater and delivers it to a spreader above coffee grinds in the brew basket. The heated water passes through the coffee grinds and into a carafe.

The spreader is designed to distribute the heated water evenly over the coffee grinds, however the outflow of heated water from the holes in the spreader is just randomly dispersed, and in most case the heated water generally flows through the center portion of the brew basket. There is typically less wetting of the coffee grinds at the outer edges of the brew basket.

In addition, the turbulence created by the outflow of heated water from the spreader is not strong enough to mix the wetted coffee grinds. The wetted grinds become closely packed together which hinders the infusion through the wetted grinds. This results in uneven extraction of the coffee grinds and has an adverse effect on the quality of the coffee beverage.

SUMMARY OF INVENTION

It is an object of the present invention to overcome or ameliorate the above problems, or at least to provide the public with a useful alternative.

According to a first aspect of the invention there is provided a method of making coffee in a drip-type coffee maker including introducing a rotating paddle to a brew basket to stir coffee grinds in the basket, and passing heated water through the coffee grounds to infuse the water.

According to a second aspect of the invention there is provided a coffee maker including:
- a water reservoir,
- an in-line water heater,
- a brew basket for receiving coffee grinds,
- a water passage between the reservoir and the brew basket, the passage passing through the in-line water heater for delivering heated water to the brew basket,
- a paddle removably disposed in the brew basket, and
- a drive for rotating the paddle while heated water is delivered to the brew basket.

Preferably, the brew basket has a recess in its base, and the paddle comprises:

- a boss for locating within the recess of the brew basket,
- first and second horizontal blades extending diametrically from the boss,
- a first substantially vertical blade connected to the first horizontal blade,
- a second substantially vertical blade connected to the second horizontal blade, and
- a drive ring connecting the first and second vertical blades, the drive ring releasably engaging the drive for rotating the paddle.

Preferably, the drive is a motor having a toothed gear on an output shaft, the drive ring having a plurality of teeth about its outer periphery for engaging the toothed gear.

Preferably, the drive ring includes a guide lip for slidably bearing against the brew basket.

Preferably, the coffee maker includes a filter element located between the brew basket and the paddle.

Further aspects of the invention will become apparent from the following description, which is given by way of example only.

BRIEF DESCRIPTION OF THE DRAWINGS

Embodiments of the invention will now be described by way of example only and with reference to the accompanying drawings in which.

DESCRIPTION OF THE PREFERRED EMBODIMENTS

Figure 1:
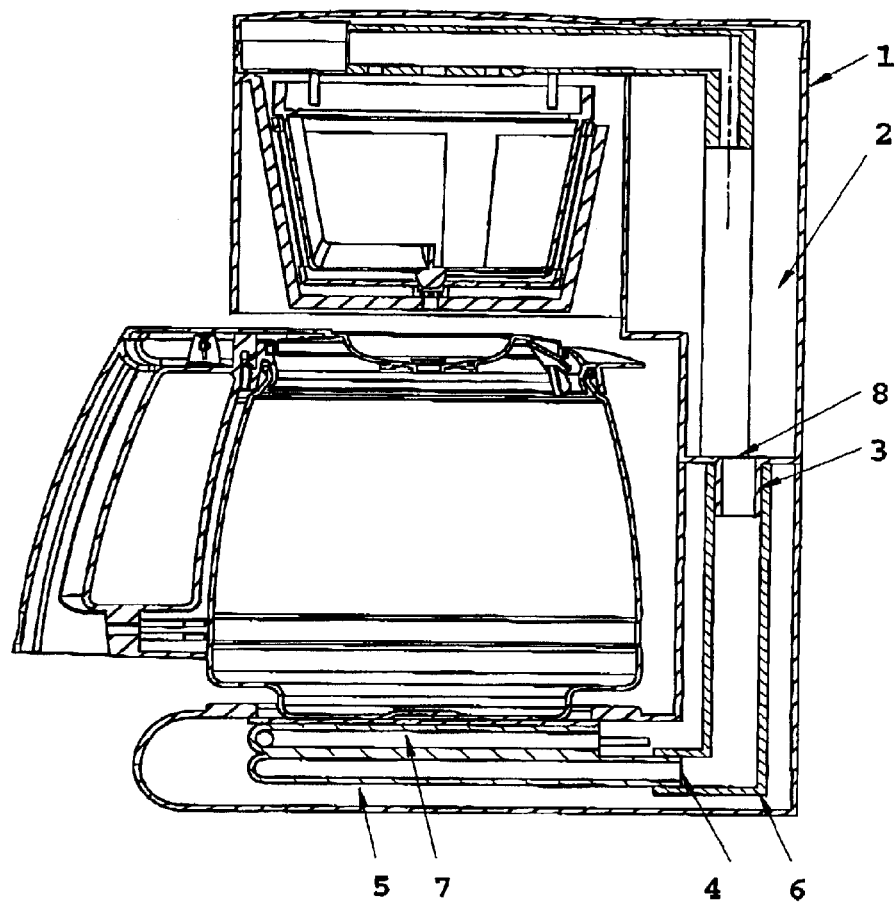
FIG. 1 illustrates a first sectional view through a drip-type coffee maker according to the invention.

Referring to FIG. 1, a coffee maker comprises an enclosure 1 with an integral reservoir 2 for storing water. An outlet 3 from the reservoir 2 is connected to an inlet 4 of a metal tube 5 by a silicone rubber tube 6. An inline water heater 7 is integrated with metal tube 5. The water in the reservoir will flow into the metal tube 5 through the opening 8 of the outlet 3.

Figure 2:
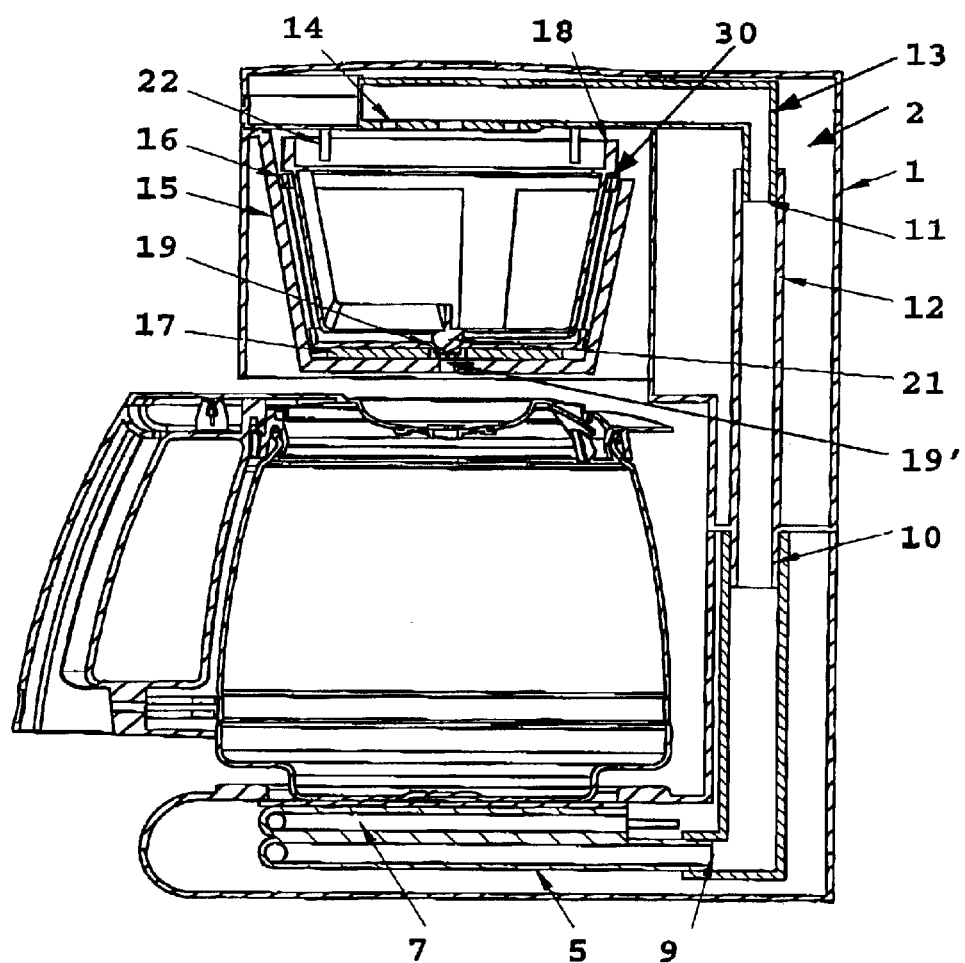
FIG. 2 illustrates a second sectional view through the drip-type coffee maker.
Figure 3:
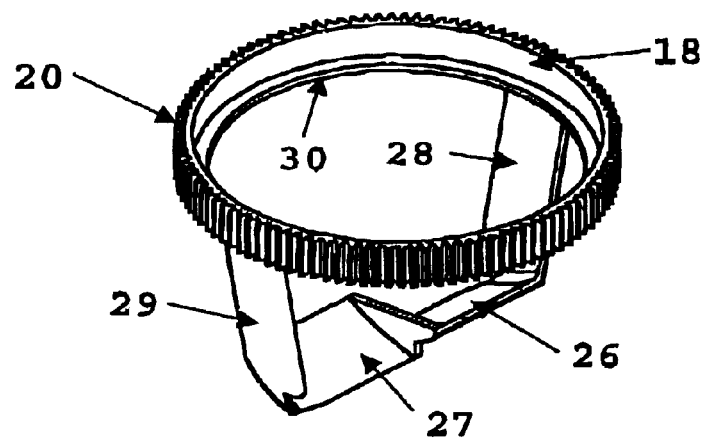
FIGS. 3 to 6 illustrate a stirring paddle.
Figure 4:
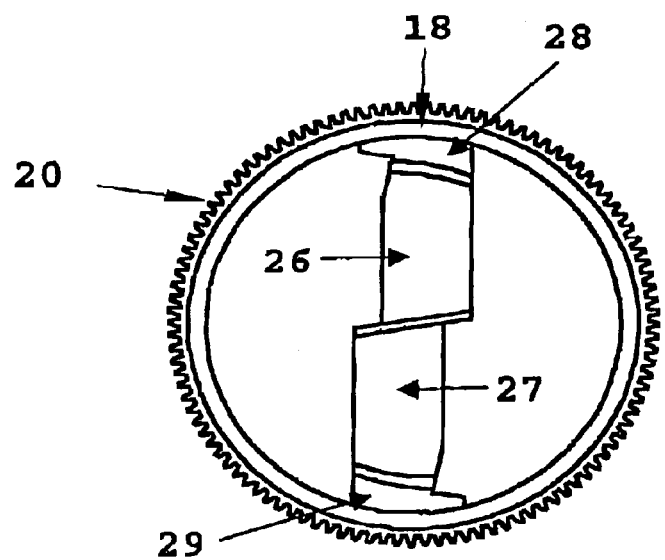
Figure 5:
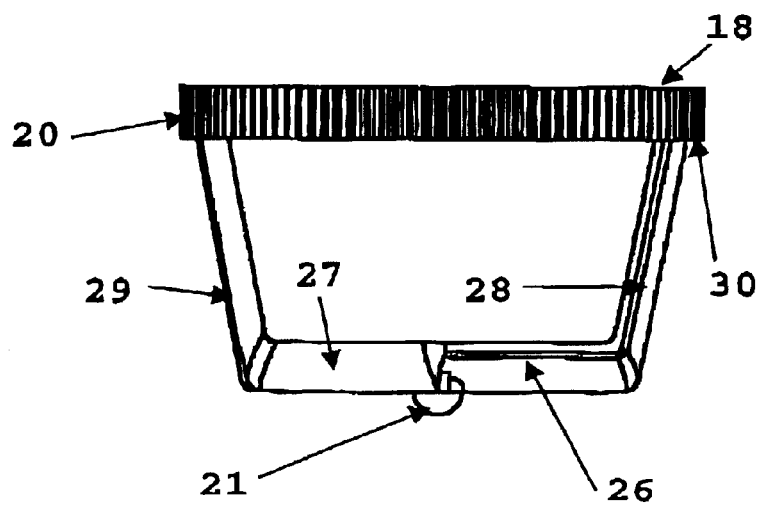
Figure 6:
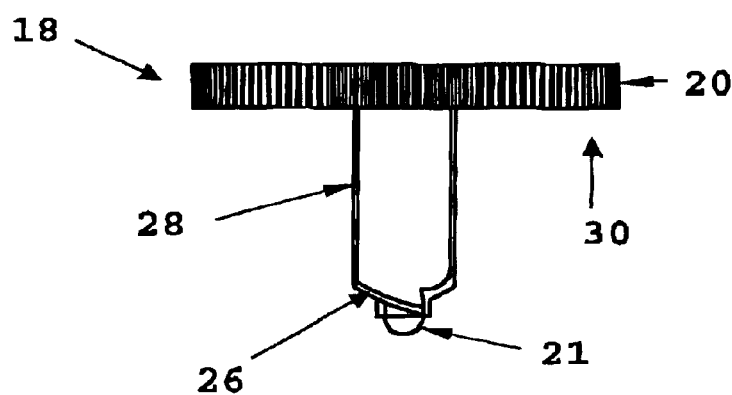

Referring to FIG. 2, an outlet 9 of the metal tube 5 is connected to inlet 10 of a riser tube 12 by a silicone rubber tube. The inlet 11 of a spreader 13 connects to the riser tube outlet 12.

When the unit is switched on (to begin a brew cycle) water inside the metal tube 5 is heated by heater 7. The temperature of the water rises and steam pressure is generated. When the pressure accumulated inside the metal tube 5 is greater than the atmospheric pressure. The heated water is forced up the riser tube 12 to the spreader 13. The spreader 13 has apertures 14 at its bottom. Heated water will flow through apertures 14 of the spreader 13. Arrangements similar to the above are well known in the art.

A brew basket is disposed under the spreader 13. The brew basket comprises a metal or plastic mesh filter 16 located inside an open top vessel 15. The filter 16 has ribs 17 at its base. These ribs 17 prevent the filter 16 being rotated inside the vessel 15. There is a recess or bore 19 in the base of the filter 16 and brew basket. A paddle 18 is located within the brew basket for stirring the coffee grounds while water is discharge from apertures 14 of spreader 13.

FIGS. 3 to 6 illustrate paddle 18 in detail. The paddle comprises a boss 21 for locating within the recess 19 of the brew basket. First and second horizontal blades 26, 27 extend diametrically from the boss 21. The blades are arrange at an angle so that, in use, they slidably engage the base of the filter 16 of brew basket. First and second vertical blades 28, 29 extend upwardly from the distal ends of first and second horizontal blades 26, 27 respectively. The first and second vertical blades 28, 29 are adapted to, in use, slidably engage the inside walls of the filter 16, A drive ring 20 is located concentric to boss 21 and connects the upper ends of first and second vertically blades 28, 29 at their top ends. The outer periphery of drive ring 20 has a plurality of teeth in a gear arrangement.

The paddle 18 rotatably locates within the brew basket by location of boss 21 within recess 19 at the bottom of the brew basket. A guide on the underside 30 of ring 20 slidably locate against the top rim of the brew basket to rotatably support the top of the paddle 18.

Figure 7:
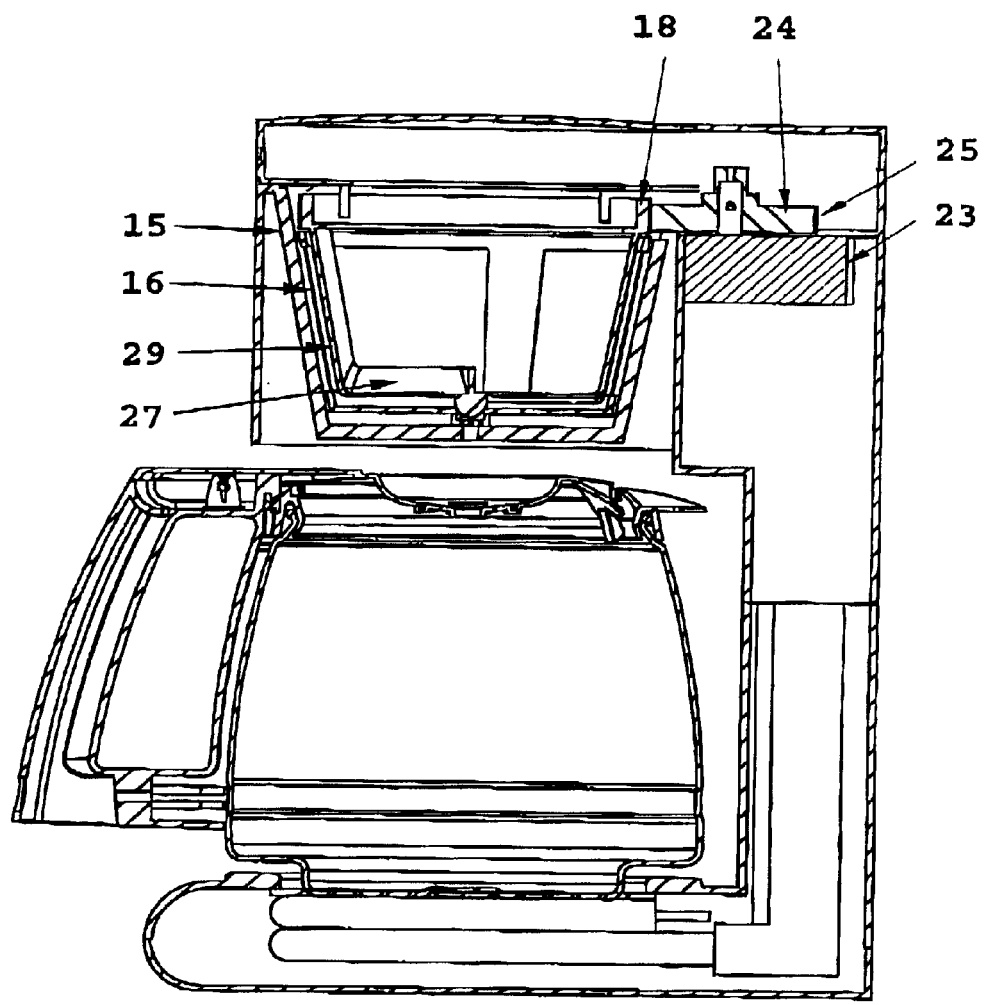
FIG. 7 illustrates a sectional view of the paddle and driving means.
Figure 8:
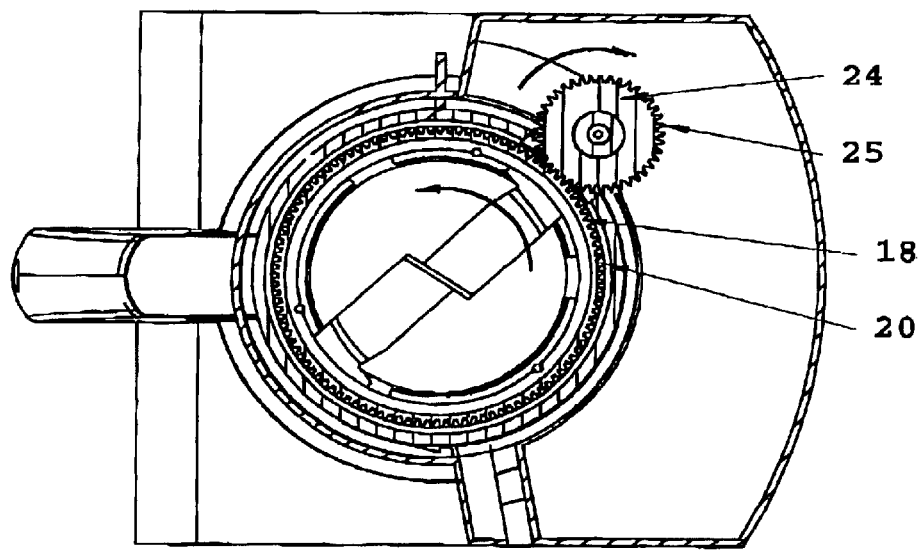
FIG. 8 illustrates a top view of the paddle, brew basket and driving means.

Referring to FIGS. 7 and 8, a motor 23 is located at the side of the brew basket 15. The output shaft of the motor 23 is mounted with a driving gear 24 which a toothed periphery 25 matching ring 20. The toothed gear 24 engages the periphery teeth of drive ring 20. During the brewing cycle the driving gear 24 will drive the paddle 18 to make it rotate inside the brew basket 15. The rotating paddle 18 will mix the coffee grinds with the heated water by keeping the coffee grounds in running stage. This results in even wetting of all coffee grounds.

Where in the foregoing description reference has been made to integers or elements having known equivalents then such are included as if individually set forth herein.

Embodiments of the invention have been described, however it is understood that variations, improvements or modifications can take place without departure from the spirit of the invention or scope of the appended claims.

What we claim is:

1. A coffee maker comprising:
   a water reservoir,
   an in-line water heater,
   a brew basket for receiving coffee grinds,
   a water passage between the reservoir and the brew basket, the passage passing through the in-line water heater for delivering heated water to the brew basket,
   a paddle removable disposed in the brew basket, and
   a drive for rotating the paddle while heated water is delivered to the brew basket wherein the brew basket has a recess in its base for locating a paddle and the paddle comprising:
   a boss for locating within the recess of the brew basket,
   first and second horizontal blades extending diametrically from the boss,
   a first vertical blade extending upwardly from the first horizontal blade,
   a second vertical blade extending upwardly from the second horizontal blade, and
   a drive ring connection the first and second vertical blades, the drive ring releasably engaging the drive for rotating the paddle.

2. A coffee maker as claimed in claim 1 wherein the drive is a motor having a toothed gear on an output shaft, the drive ring having a plurality of teeth about its outer periphery for engaging the toothed gear.

3. A coffee maker as claimed in claim 1 wherein the drive ring includes a guide lip for slidably bearing against the brew basket to rotatably support the paddle.

4. A coffee maker as claimed in claim 1 including a filter element located between the brew basket and the paddle.

5. A coffee maker comprising:
   a water reservoir,
   an in-line water heater,
   a brew basket having a base and a wall for receiving coffee grinds,
   a water passage between the reservoir and the brew basket, the passage passing through the in-line water heater for delivering heated water to the brew basket,
   a rotational paddle removably disposed in the brew basket and having a first blade parallel to the base, a second blade connected to the first blade and parallel to the wall and a drive ring connected to the second blade, and
   a drive for engaging the drive ring and rotating the paddle.

6. A coffee maker comprising:
   a water reservoir,
   an in-line water heater,
   a brew basket having a base and wall for receiving coffee grinds,
   a water passage between the reservoir and the brew basket, the passage passing through the in-line water heater for delivering heated water to the brew basket,
   a rotational paddle removably disposed in the brew basket and having a first blade slidably engaging the base, a second blade connected to the first blade and slidably engaging the wall, and
   a drive for rotating the paddle.

* * * * *